(12) United States Patent
Lundberg et al.

(10) Patent No.: US 10,922,344 B2
(45) Date of Patent: Feb. 16, 2021

(54) IMPORTING DOCKETING DATA

(71) Applicant: Black Hills IP Holdings, LLC, Minneapolis, MN (US)

(72) Inventors: Steven W. Lundberg, Edina, MN (US); Thomas G. Marlow, Cape Elizabeth, ME (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 203 days.

(21) Appl. No.: 16/159,387

(22) Filed: Oct. 12, 2018

(65) Prior Publication Data

US 2020/0117753 A1 Apr. 16, 2020

(51) Int. Cl.
*G06F 7/00* (2006.01)
*G06F 16/33* (2019.01)
*G06F 16/38* (2019.01)
*G06F 16/93* (2019.01)
*G06F 16/178* (2019.01)

(52) U.S. Cl.
CPC ........ *G06F 16/334* (2019.01); *G06F 16/1794* (2019.01); *G06F 16/38* (2019.01); *G06F 16/93* (2019.01)

(58) Field of Classification Search
CPC ........ G06F 16/334; G06F 16/38; G06F 16/93; G06F 16/1794
USPC .................................................. 707/600–899
See application file for complete search history.

(56) References Cited

U.S. PATENT DOCUMENTS

2006/0178925 A1\* 8/2006 Meece ................... G06Q 10/10
705/7.19

\* cited by examiner

*Primary Examiner* — Isaac M Woo
(74) *Attorney, Agent, or Firm* — Schwegman Lundberg & Woessner, P.A.

(57) ABSTRACT

Methods and systems for importing docketing data are provided. The method includes retrieving, from a storage device, a first data structure that includes docketing information for a plurality of matters from a source docketing system; searching a publicly available database to retrieve information associated with the first matter; verifying that data in at least one field of the first matter matches data in a corresponding field of the retrieved information; automatically detecting existence of an error in the first matter based on a combination of two or more fields of the first matter; and storing the first matter in a target docketing system.

20 Claims, 10 Drawing Sheets

Matter Home ?  Return to Matter List

400
401 Matter  Edit Matter Audit  Special Instructions

| | | |
|---|---|---|
| Title | PATENT DOCKETING SYSTEM | File # 402  3000.001US |
| Matter Type | Patent | Country  United States of America |
| Client | Company BH | Client File # |
| FIP ID | 271761 | Post Examination Pub Date |
| Status | Issued  404 | Matter Entity Size  Small |
| Date Filed | 3/20/2006 | Grant Date  Dec 3, 2013 |
| Application # | 12/324,688 | Patent #  7,799,999    406 |

Sequence of Activity Types — 810

| Activity Type 1 | Activity Type 2 |
|---|---|
| Application Filing | Filing Confirmation, Assignment Due, Office Action, Examiner Interview Summary, or Allowance |
| Office Action | Response to Office Action Filed |
| Allowance | Issue Fee Payment, Issuance, Patent Expiration, Maintenance Fee Due |
| Issuance | Maintenance Fee Due |
| Response Filed | Office Action, Allowance |
| Disclosure Received | Application Filing |

Latest Activity Types For Status/Country — 820

| Status/Country | Latest Activity |
|---|---|
| Unfiled | Disclosure Received |
| Pending | Application Filed, Office Action, Response to Office Action, Examiner Interview Summary, Filing Confirmation |
| Allowed | Issue Fee Payment, Allowance |
| Issued | Issuance, Maintenance Fee Due |
| Expired | Patent Expiration |
| Australia | Acceptance Deadline |

IMPORTING DOCKETING DATA

BACKGROUND

The management of patent portfolios involves multiple stages of the patent lifecycle. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force. Patent management tools are used by companies and law firms for active patent matters (e.g., unfiled, pending and issued patent matters) as well as inactive patent matters (e.g., expired, abandoned or closed patent matters) to enable users to efficiently manage patent matters throughout the patent lifecycle.

Many patent management tools include patent docketing capabilities for tracking important due dates for PTO related deadlines and providing a document repository for PTO related correspondences and documents. The patent docketing process may involve (1) storing all key intellectual property information in a centralized and consolidated database; (2) providing access to critical information from documents (e.g., correspondences between law firms and the U.S. PTO, or law firms and clients) and deadlines (e.g., PTO deadlines and non-PTO deadlines); and (3) providing customizable workflows for streaming and automating the patent management processes throughout the patent lifecycle.

Companies and law firms rely on the accuracy of the information contained in the patent management tools to make informed decisions. Oftentimes, patent matters are transferred from one law firm which uses one type of docketing system (a source docketing system) to another law firm which uses another docketing system (a target docketing system). To perform such transfers, the docketing data from the source docketing system is typically manually entered in a spreadsheet, converted into a suitable format, and then imported into the target docketing system. Such a process is prone to errors that can result in typographical errors arising from manual entry of information or the format conversion. Namely, a human may accidentally enter the wrong information into the spreadsheet or the data may be entered in the wrong field by the system during format conversion. These types of errors may result in inaccuracies of the imported matters and reduce the reliability of the docketing tools and the data.

BRIEF DESCRIPTION OF DRAWINGS

Some embodiments are illustrated by way of example and not limitation in the figures of the accompanying drawings in which:

FIGS. 4-7 are depictions of user interfaces, according to an example embodiment.

FIG. 8 depicts data structures used to detect errors in imported docketing data in the patent management system, according to an example embodiment.

DETAILED DESCRIPTION

Techniques set forth in this specification enhance reliability and maintain integrity of docketing information imported to a target patent management system from a source patent management system. Particularly, the embodiments described herein ensure that the docketing data received from a source docketing system and stored in a target docketing system is accurate and error free. The data received from the source docketing system is verified for accuracy and lack of errors in two ways. First, the data is automatically checked against public information relating to the docketing data (e.g., by comparing the docketing data to a patent office database). Second, logical combinations of various fields of the data are automatically compared with what is logically expected to detect presence of errors. For example, an issued patent matter that has a pending office action does not match what is expected for the combination of these fields because issued patent matters cannot have pending office actions. A final consistency check if performed if the docketing information, at any point, was manually entered. Specifically, if any information was manually entered, the imported docketing information stored in the target docketing system is automatically checked against the corresponding source docketing information and inconsistencies are flagged for further review. By ensuring that the imported data is accurate and error free in these ways, the reliability and accuracy of the docketing system is improved.

The systems and methods set forth in this specification are described in relation to a patent management system (such as a patent docketing system) and patent matters, but it will be understood that the present invention could equally be applied to other forms of intellectual property (trademarks, copyright, registered designs, and the like). Moreover, the term "patent" is not intended to be limited to an issued patent, but may include a pending patent application or unfiled application or invention disclosure. The term "user" is intended to cover any person interacting with the patent management system. A user may be an inventor, portfolio manager, business manager, patent attorney, patent paralegal, or patent docketing personnel, for example.

Figure 1:
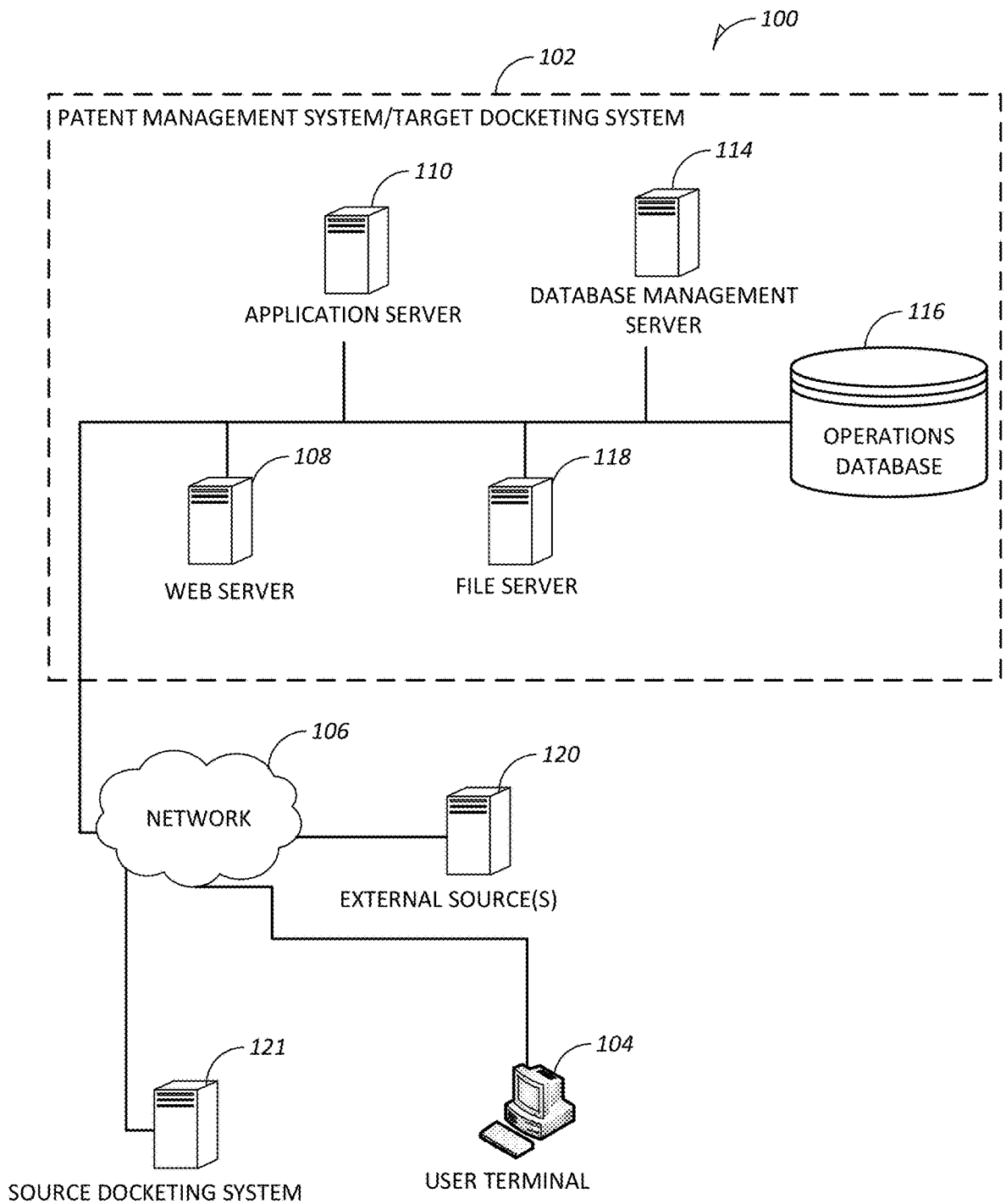
FIG. 1 is a system component diagram, according to an example embodiment.

FIG. 1 is a schematic view of computer network system 100 according to various embodiments. The computer network system 100 includes patent management system/target docketing system 102 and user terminal 104 communicatively coupled via network 106. In an embodiment, patent management system 102 includes web server 108, application server 110, and database management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the software components of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a matter database a portfolio database, a user database, a mapping database, and an analytics database. Operations database 116 may be implemented as a relational database, a centralized database, a distributed database, an object oriented database, or a flat database in various embodiments.

In various embodiments, the patent management system framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes and other structures, names, or formats may be used. Additionally, further associations between data stored in the databases may be created as discussed further herein. As referred to herein, docketing information includes bibliographic information, docketing activity information, deadline information, or documents associated with a given matter or portfolio or any other information stored in the patent management system databases.

During operation of patent management system 102, data from multiple data sources (internal and external) may be imported into or accessed by the operations database 116. Internal sources may include data from the various tools of the patent management system. External sources 120 may include publicly available databases such as websites or databases associated with foreign and domestic patent offices, assignment databases, WIPO, and INPADOC. In various embodiments, the data is scraped and parsed from the websites. The data may be gathered using API calls to the external sources 120 when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 5:
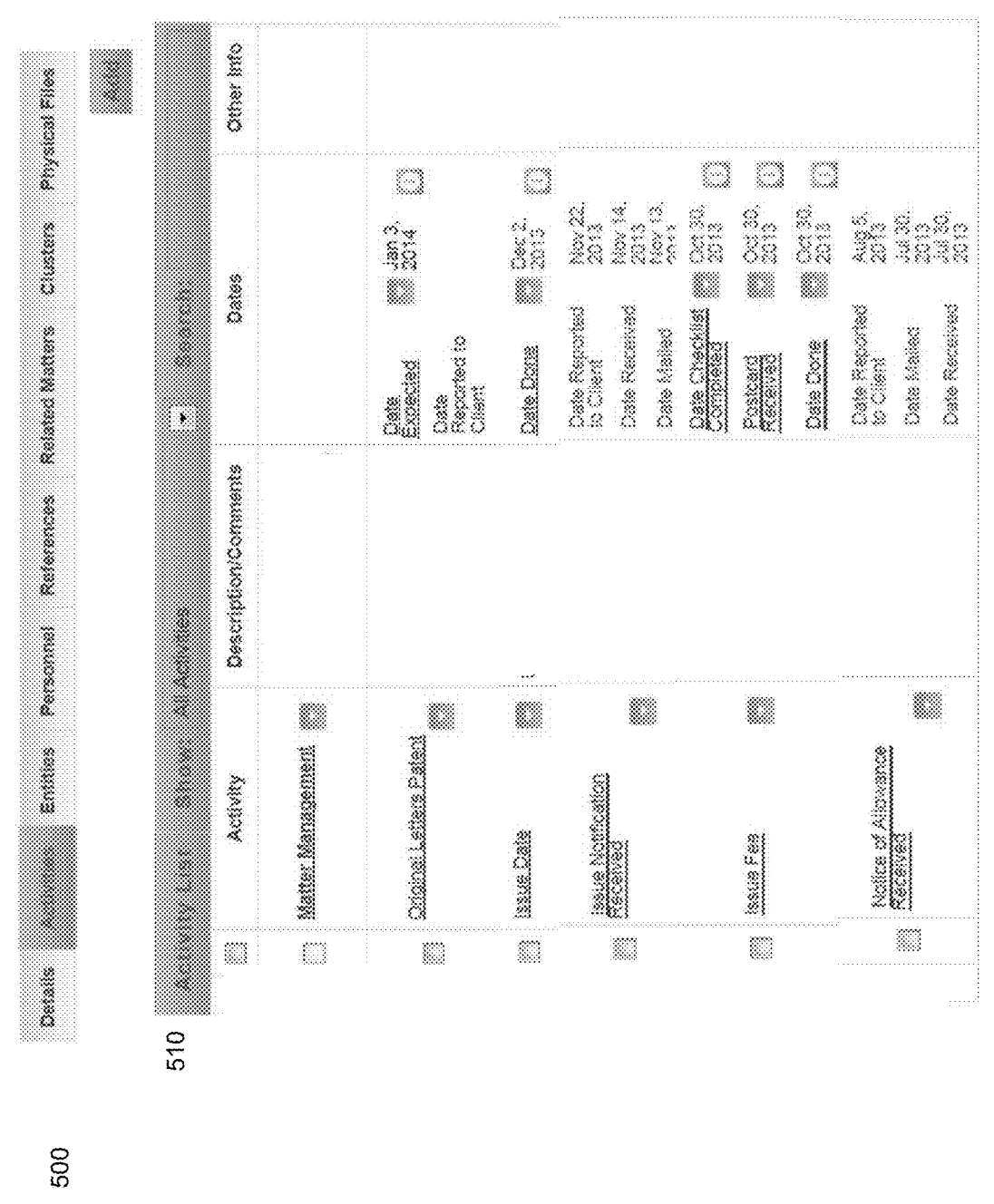
Figure 6:
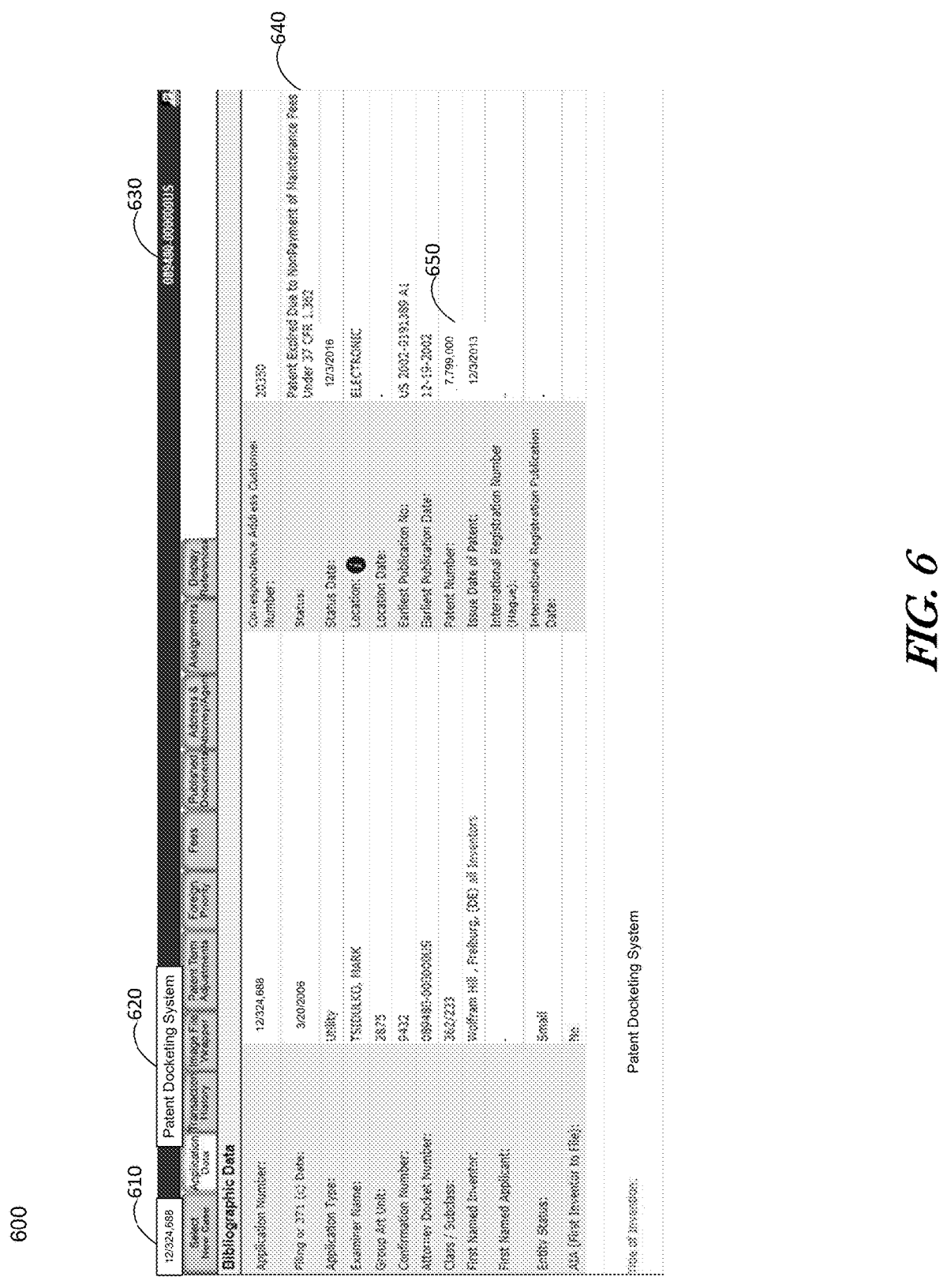
Figure 7:
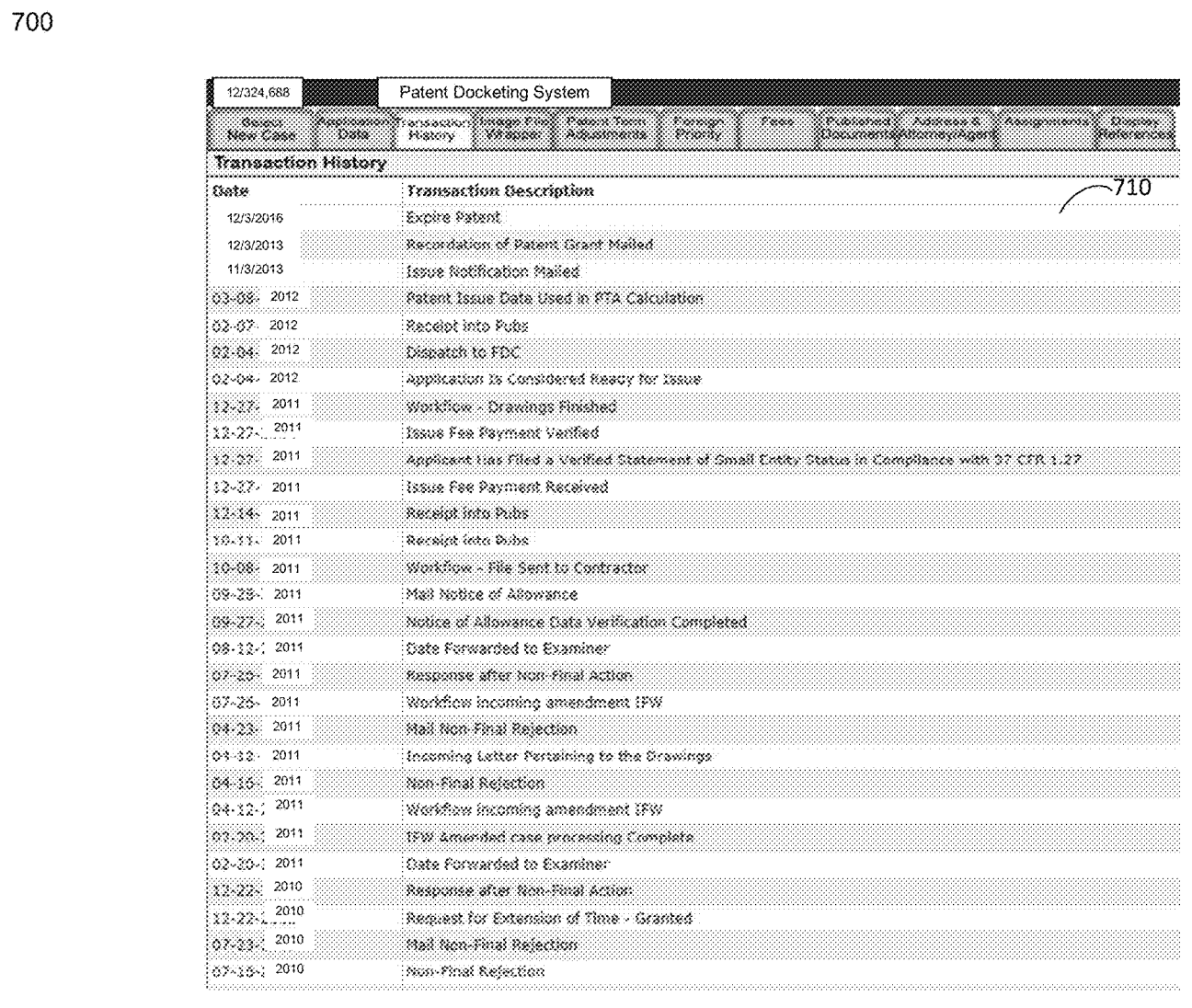

In some embodiments, docketing information or data may be transferred from a source docketing system 121 into the patent management system/target docketing system 102. The docketing information from the source docketing system 121 may be in a different format than the format of the data in the target docketing system 102. In such cases, the data from the source docketing system is standardized into a common format. After or before standardizing, the data from the source docketing system is compared with corresponding data from the external sources 120. For example, docketing information from the source docketing system may relate to a given U.S. patent matter. In this case, the U.S. Patent and Trademark Office database (via the Patent Application Information Retrieval (PAIR) system) may be accessed based on the bibliographic information f the given U.S. patent matter (e.g., the application number). The information accessed on the PAIR system is then compared with the U.S. patent matter obtained from the source docketing system to ensure the information matches. For example, the title field of the given matter from the source docketing system may be compared with the title field of the patent matter from the PAIR system to detect typographical errors or inconsistencies. If an inconsistency is found, the source docketing system may be corrected using the information obtained from PAIR or an operator may be notified via user terminal 104. FIGS. 4-7 below illustrate exemplary user interfaces of the source docketing system 121 information (FIGS. 4 and 5) and information obtained from the PAIR system (FIGS. 6 and 7).

Figure 2:
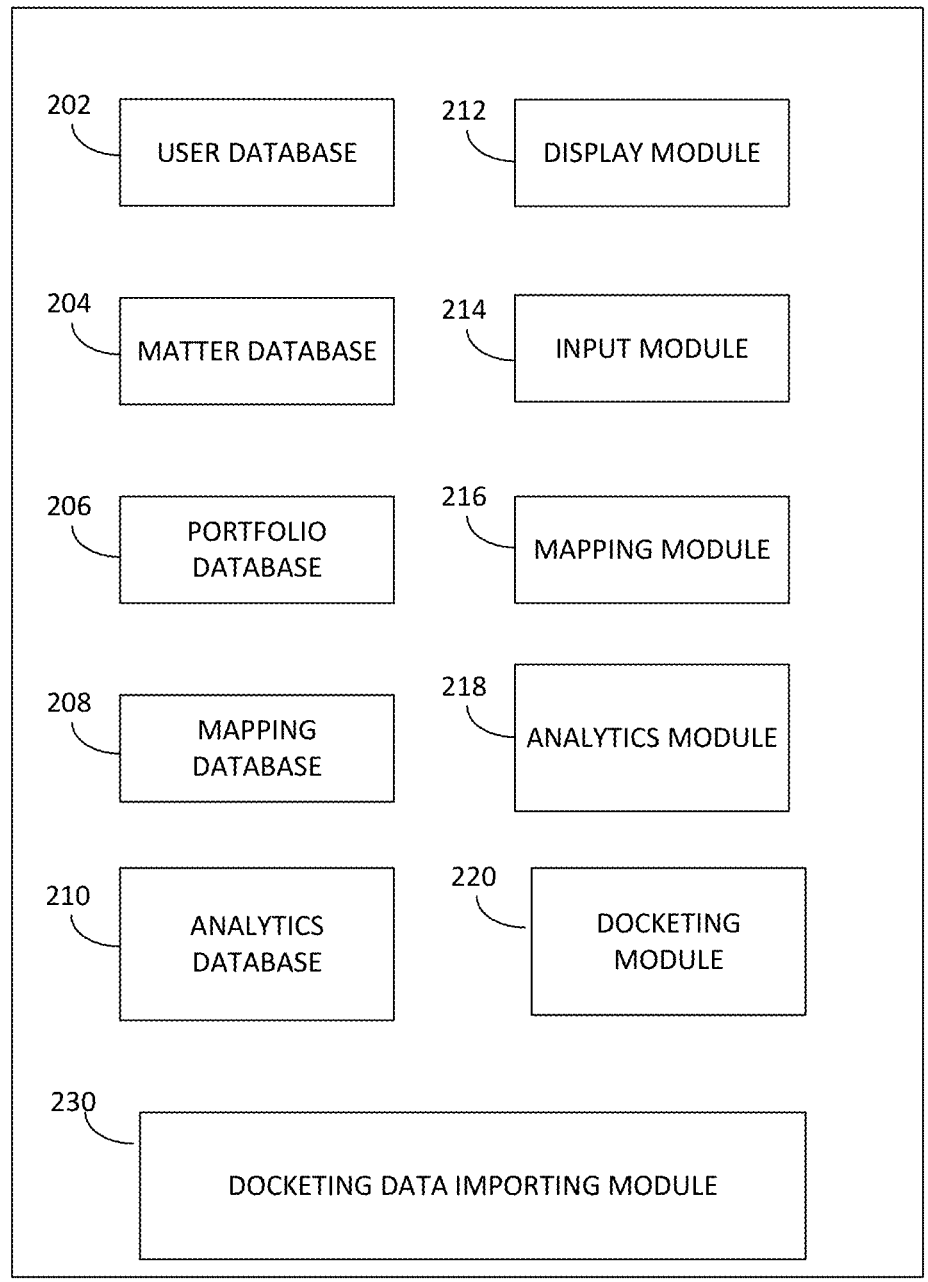
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, docketing module 220, and docketing data importing module 230. The components illustrated in FIG. 2 may be implemented by one or more of the components shown in FIG. 1 for patent management system/target docketing system 102. In various embodiments, the data stored in databases 202, 204, 206, 208, and 210 may be in the same or multiple physical locations. Data stored in any of databases 202, 204, 206, 208 and 210 may be referred to as docketing information. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212, 214, 216, 218, 220 and 230 may be executed across multiple computer systems.

In an embodiment, matter database 204 stores docketing information representing matters as well as file histories, correspondences, and other documents related to patent matters. Each matter may be associated with one or more portfolios. In some embodiments, a matter is associated with no portfolios. In various embodiments, a matter is a foreign or domestic patent or application. Matters may also be inventions that have not yet been filed. In an embodiment, docketing information in a matter entry includes bibliographic fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, customer or client instructions, and annuity information (e.g., due date, country, and amount due). In an embodiment, docketing information in a matter entry includes activity fields representing a list of activities from oldest to newest including upcoming due dates and past completed activities. Activities may include disclosure receipt, application filing, office actions received, office action responses filed, allowances received, issue fee payments, patent expiration, maintenance fees, etc.

More or fewer data fields associated with a patent may be included in a matter entry stored in matter database 204. In an example embodiment, matter database 204 may store a patent matter database, wherein this database includes patent matter data and related documents and communications. For an example embodiment, a complete list of docketing activity templates is stored in a table in matter database 204 and/or analytics database 210.

In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any docketing information pertaining to patents or patent applications, such as serial numbers, title, cited art, inventor or assignee details and the like. Data received from a source docketing system may also be compared with corresponding data scraped and parsed from publicly available databases or websites in a similar manner before being imported or integrated into the target docketing system. As the data is gathered, scraped, parsed and imported, the data is checked for errors before or after being imported in the manner described in connection with FIGS. 3A and 3B.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated the patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 206.

For various embodiments, a portfolio may represent all matters associated with a particular law firm, client, technology or other grouping of matters. By grouping portfolios in this manner, the docketing processes for docketing the next most probable docketing activity may be customized or tailored for a particular client or law firm. For example, a law firm managing portfolios of several clients, may decide to tailor their docketing process flows for the individual clients based on the client's internal intellectual property procedures. This may require the law firm to add customized docketing activity templates to track non-PTO activities.

In various embodiments, mapping database 208 may include mappings of patent concepts to one or more matters. For example, the mapping module 216 is configured to facilitate mappings to associate at least one response due date or other date (e.g., date mailed) with the at least one downloaded document.

In an embodiment, display module 212 is configured to display user interfaces and information retrieved from one or more databases 202-210. If a user is accessing patent management system 102 remotely (e.g., through a web browser), display module 212, representing a user-interface through a network to a user terminal, may be configured to transmit data. In various embodiments, display module 212 may present patent matters bibliographic details, as shown in FIG. 4 and various docketing activities docketed including relevant dates for patent matters, as shown in FIG. 5. Furthermore, docketing data may be entered, through input module 214, into the user interface fields shown in FIGS. 4-5.

In various embodiments, input module 214 receives data from multiple sources where it may be further processed by one or more other modules and stored in one or more of databases 202-210. In various embodiments, input module 214 of the patent management system 102 may comprise a search engine (not shown) for conducting searches at a patent registry or on the Internet. For example, input module 214 may be configured to utilize one or more APIs to data from one or more patent data stores or publicly available databases (e.g., public PAIR, private PAIR, INPADOC, foreign patent offices, patent docketing systems, portfolio management systems, etc.). The data may include published patent documents, patent applications, office actions or other patent office correspondences, prior art references, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example patent management system 102 may present multiple user interfaces to a user. These user interfaces may enable users to input data directly into databases 202-210, instruct the patent management system to retrieve data from patent data stores, and instruct the patent management system to perform various operations (e.g., analysis) on the data in databases 202-210.

Additionally, input module 214 may be configured to determine the selection of one or more user interface elements by a user and initiate the action associated with the selected user interface element. In other example embodiments, input module 214 may be configured to receive user input to select patent matters and patent activity templates for docketing, and then provide the necessary information to update the patent activity templates to generate the docket due dates or other due dates to implement the user's patent management workflows.

In various embodiments, input module 214 processes the data that has been inputted and formats it according to the data fields of databases 202-210 as discussed above. In various embodiments processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). A user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments the parsing module may parse multiple pieces of information before generating a database entry. For example, input module 214 may receive a docket number for an issued patent. The docket number may be combined with the information parsed from the issued patent to form an entry in matter database 204.

In various embodiments, the docketing module 220 is configured to provide template-based docketing of activities for patent matters with country-law-based due date calculations and customizable workflows to automate docketing activities as needed. The docketing module 220 includes docketing activity templates for the various PTO activities and other templates for non-PTO activities for managing PTO and non-PTO due dates and activities, both of which can be pre-defined by the system or customized by users to implement the desired patent docketing workflows. Examples of non-PTO templates and docketing activities include the tracking of due dates for managing internal tasks within a law firm or corporate patent department, or tracking correspondences to-and-from foreign associates who are the registered agents for the patent matters in their respective PTO.

Several key decisions such as filing international applications or filing divisionals/continuations/CIPs, and annuity payment review can be triggered directly from docketing module 220. The docketing module 220 calculates the deadlines based on filing, prosecution, and grant dates for each patent matter or other prosecution dates (e.g., date mailed, date received, etc.), jurisdiction and applicable laws and applicable, and type of filing. Furthermore, the docketing module 220 is updated with the applicable country laws for all major countries as needed. Additionally, the docketing module 220, together with display module 212 and input module 214, provides an interface for users to appropriately input docketing data required (including the selection of the next most probable docketing activity) for docketing and due date generation into the relevant fields.

Tracking statutory deadlines and storing PTO correspondences is critical for managing patent portfolios effectively. Several PTO offices provide electronic data access for filing, prosecution, and maintenance-related activities, which can be accessed by the docketing module 220 via input module 214, which may have an electronic interface, such as an API, for fully or partially automating the downloading of documents and correspondences from the PTOs and/or uploading and docketing in the user's patent management or docketing system. The PTO correspondences are stored in matter database 204 and can be retrieved thru input module 214 by the user.

Patent docketing systems may be maintained or updated automatically, as described above, or by patent docketing specialists who performs docketing and upload documents and correspondences into the patent management system 102 as PTO correspondences are received. Furthermore, the patent management system needs to be updated with information and docketing activities as patent attorneys, agents or paralegals complete patent activities, such as filing various responses with the U.S. PTO. The patent docketing process requires trained patent docketing specialists, who understand the patent lifecycle and PTO rules and regulations to properly docketed patent matters as responses or other documents are filed with the PTO, or received from the PTO, to docket PTO activities. Other non-PTO activities may also be important to docket, for example, law firms docket their internal processes for implementing their client requested procedures or correspondences with foreign associates who communicate and file responses directly with their respective foreign patent offices.

In various embodiments, docketing data importing module 230 processes docketing data received from a source docketing system 121 (e.g., from a first law firm database) and stores the received docketing data in the target docketing system 102. For example, a user via user terminal 104 may direct docketing data importing module 230 to a file stored in file server 118 that includes the docketing data from source docketing system 121. The user may also issue an instruction to docketing data importing module 230 to obtain the data stored in file server 118 and process the data in the manner discussed in FIGS. 3A and 3B below for storage and import to operations database 116 of target docketing system 102.

As discussed below, docketing data importing module 230 coverts the format, if needed, of the source docketing data into a format of target docketing system 102. Docketing data importing module 230 may verify and correct errors in the data before or after storage in the target docketing system 102 in various ways. For example, docketing data importing module 230 may check the source docketing data against one or more publicly available databases, such as external sources 120 (e.g., a government patent database). Docketing data importing module 230 may update any missing or incorrect information, as determined based on this comparison, with the information from the external sources 120 and/or may inform an operator via user terminal 104 about the differences between the source docketing data and the external sources 120 information. Docketing data importing module 230 may correct errors in the source docketing data based on logical combinations of multiple fields of the docketing data. For example, docketing data importing module 230 may determine whether a logical combination (e.g., a sequence of fields or latest activity types for a given status/country) matches an expected logical combination of the fields. FIG. 8, below, provides illustrative data structures of expected logical combinations of fields of docketing information that docketing data importing module 230 may access to determine the expected logical combination of the fields. If a given logical combination does not match the expected combination, docketing data importing module 230 may inform an operator via user terminal 104 for further correction.

Docketing data importing module 230 may also determine whether any of the information imported into target docketing system 102 was manually entered. If so, docketing data importing module 230 may obtain the manually entered information and compare that information with the corresponding information stored in source docketing system 121 or the file including the data from source docketing system 121 stored in file server 118. Docketing data importing module 230 may flag any discrepancies detected based on this comparison for an operator to review via user terminal 104.

Figure 3A:
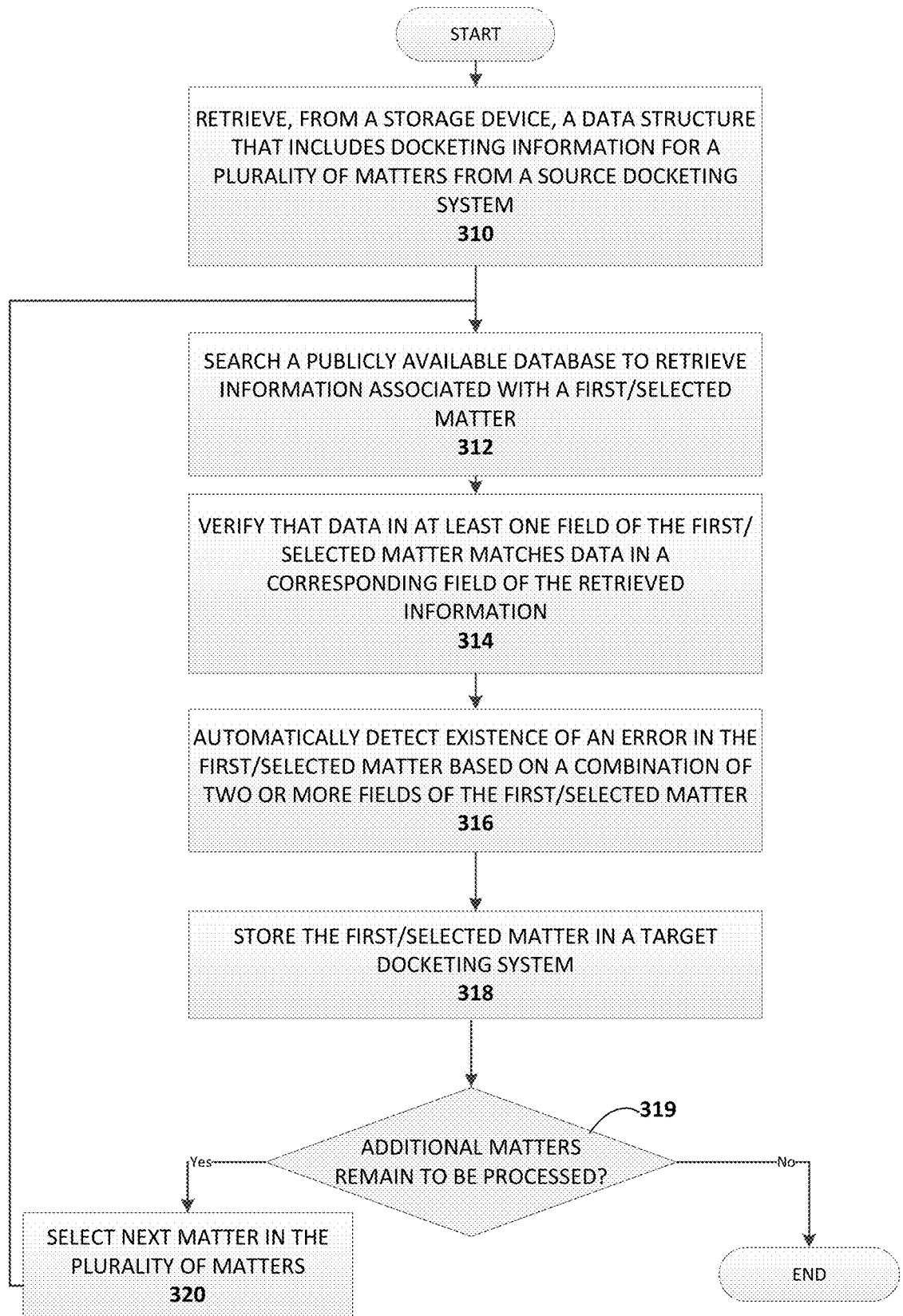
FIGS. 3A and 3B are block diagrams showing processes for importing docketing data into the patent management system, according to example embodiments.

FIG. 3A is a block diagram showing a process 301 for importing docketing data into a target patent management system from a source patent management system, according to example embodiments. The operations discussed below in connection with FIG. 3A may be performed in any order or may be omitted entirely. The operations of FIG. 3A may be a set of non-transitory or transitory computer readable instructions that docketing data importing module 230 may execute to import data from a source docketing system into a target docketing system.

At operation 310, docketing data importing module 230 retrieves, from a storage device, a data structure that includes docketing information for a plurality of matters from a source docketing system 310. For example, docketing data importing module 230 may access a file either directly from source docketing system 121 or from file server 118. The file may include one or more portfolios and/or a set of matters that are to be imported from source docketing system 121 to target docketing system 102.

In some embodiments, the file that includes the source docketing information may be a comma separated value file, a spreadsheet, a database file or any other suitable arrangement of information. The format of the file (e.g., names of various fields or arrangement of the fields) may be different between the source and target docketing systems. In such cases, docketing data importing module 230 may automatically or based on instructions from a user reformat the file to match the format of the target docketing system. For example, the names of various fields may be changed to match the names of the target docketing system. In some embodiments, a user may manually inspect the source docketing information format and provide instructions to docketing data importing module 230 as to how to reformat the file. In some embodiments, docketing data importing module 230 may have a set of rules representing how docketing information is arranged in various docketing systems and how to convert such docketing information to the target docketing system format. For example, docketing data importing module 230 may determine what type of docketing system was used by source docketing system 121 and then may access the set of rules to determine if the docketing system type is included among the set of rules. If the docketing system type is found in the set of rules, docketing data importing module 230 may retrieve the instructions on how to reformat the data to the target docketing system format and automatically reformat the source docketing system data into the target docketing system format.

FIGS. 4 and 5 illustrate source docketing information arranged in the target docketing system format. Specifically, FIG. 4 shows a number of bibliographical fields 400 of docketing information for a matter 401 (e.g., matter title, file number, country, status, date filed, grant date, application number, etc.) of a plurality of matters that are to be imported by docketing data importing module 230. FIG. 5 shows a number activity fields 500 of docketing information for the matter (e.g., original letter patent, issue date, issue notification received, issue fee due date, etc.).

At operation 312, docketing data importing module 230 searches a publicly available database to retrieve information associated with a first/selected matter. For example, docketing data importing module 230 may access docketing information from matter 401 (FIG. 4) of a given matter to be imported. In particular, docketing data importing module 230 may access a country field of the matter and an application or patent number of the matter. Docketing data importing module 230 may access any field of the bibliographic information of the matter to search the publicly available database. Based on the country determined from the country field, docketing data importing module 230 may access a list of available publicly available databases that include information for the given country. Each of the databases on the list may have a priority designation and docketing data importing module 230 may select the database with the highest priority to search. For example, docketing data importing module 230 may determine that the matter country is United States and based on the list of available database, docketing data importing module 230 may determine the PAIR is the highest priority database that contains information for the given matter country. Docketing data importing module 230 may access PAIR and send the application number or patent number of the matter to PAIR to access the information from the publicly available database.

FIGS. 6 and 7 show an illustrative arrangement of information retrieved from PAIR by docketing data importing module 230. Specifically, FIG. 6 shows an illustrative set of bibliographic information 600 including application number 610, title 620, docket number 630, status 640 and patent number 650 obtained from PAIR based on the application or patent number sent by docketing data importing module 230. FIG. 7 shows an illustrative set of activities 700 including latest status 710 obtained from PAIR based on the application or patent number sent by docketing data importing module 230. Docketing data importing module 230 may process the HTML file for each of FIGS. 6 and 7 to retrieve the relevant bibliographic or activities of the matter from the publicly available database. In some embodiments, instead or of in addition to processing the HTML file, docketing data importing module 230 may perform image recognition on the user interface shown in FIGS. 6 and 7 to retrieve the corresponding information.

At operation 314, docketing data importing module 230 verifies that data in at least one field of the first/selected matter matches data in a corresponding field of the retrieved information. For example, docketing data importing module 230 may compare all or a subset of fields of docketing information from the source docketing system with the docketing information obtained from the publicly available database. In particular, docketing data importing module 230 may compare the title of the docketing information from the source docketing system with the title obtained from the PAIR database for the matter. If the titles match, docketing data importing module 230 may determine that the source docketing system docketing data is verified and does not need to be corrected. If the titles do not match, docketing data importing module 230 may replace the title in the source docketing system information that is to be imported with the title obtained from PAIR for the file. In some cases, the field may have a designated priority level that indicates to docketing data importing module 230 to flag the mismatch of docketing information between PAIR and the docketing information from the source docketing system for an operator to review. For example, a mismatch in the filing date or priority date may not be automatically replaced by docketing data importing module 230 with the PAIR information. Rather, docketing data importing module 230 may alert an operator to verify the information because such a field is of higher importance than another field, such as the title.

As an example, docketing data importing module 230 may compare bibliographic information 400 from the source docketing system data with bibliographic information 600 obtained from the publicly available database. In particular, docketing data importing module 230 may compare the file number 402 (FIG. 4) of the formatted source docketing information that is to be imported with the corresponding docket number 630 (FIG. 6) obtained from PAIR for the given matter. Docketing data importing module 230 may determine that the fields do not match. In response, docketing data importing module 230 may determine that the file number field 402 has a significant importance and may alert an operator to correct the file number in the data to be imported from the source docketing system. In another example, docketing data importing module 230 may compare the status 404 (FIG. 4) (e.g., pending) of the formatted source docketing information that is to be imported with the corresponding status 640 (FIG. 6) (e.g., expired) obtained from PAIR for the given matter. Docketing data importing module 230 may determine that the fields do not match and that the fields have a low importance level. In response, docketing data importing module 230 may replace the status 404 in the data to be imported from stating "pending" to the status 640 value obtained from PAIR stating "expired". Similarly, docketing data importing module 230 may determine that the patent number field 406 in the data to be imported does not match the patent number field 650 in the PAIR information and in response may replace the patent number field value in the data to be imported with the patent number field obtained from PAIR.

As an example, docketing data importing module 230 may compare activity information 500 from the source docketing system data with activity information 700 obtained from the publicly available database. In particular, docketing data importing module 230 may compare the last activity in the activity list 510 (FIG. 5) of the formatted source docketing information that is to be imported with the last activity 710 (FIG. 7) obtained from PAIR for the given matter. Docketing data importing module 230 may determine that the fields do not match. In response, docketing data importing module 230 may replace last activity listed in list 510 in the data to be imported with the last activity 710 obtained from PAIR or may notify a system operator about the mismatch for correction.

At operation 316, docketing data importing module 230 automatically detects existence of an error in the first/selected matter based on a combination of two or more fields of the first/selected matter. For example, docketing data importing module 230 may perform process 302 (FIG. 3B) to automatically detect existence of an error based on a combination of fields of the matter. For example, docketing data importing module 230 may obtain a sequence of two or more fields of a given matter and compare the sequence with an expected sequence for the fields. The expected sequence may be obtained from the expected sequence of activities 810 (FIG. 8) stored on a storage device. If the sequence of the two or more fields does not match the expected sequence for the activity types, docketing data importing module 230 may determine that an error exists. Similarly, docketing data importing module 230 may obtain a last activity type in the list of activities for the given matter and the current status or country of the matter. Docketing data importing module 230 may obtain a list of expected last or latest activities 820 (FIG. 8) for the status/country and if the last activity type in the matter does not match any of the list of expected last or latest activities, docketing data importing module 230 may determine that an error exists.

At operation 318, docketing data importing module 230 stores the first/selected matter in a target docketing system. For example, docketing data importing module 230 may obtain the formatted, verified and error checked source docket information and store the docket information in the operations database 116 of the target docketing system 102. In some embodiments, some or all of the source docketing information that has been verified, formatted and checked for errors may be stored in operations database 116 by manual entry via user terminal 104. In such circumstances, after the data is stored in the target docketing system, docketing data importing module 230 may compare the imported data (as entered by manual entry) with the source docketing data that has been verified, formatted and checked for errors. In response to detecting a difference between the imported data stored in the target docketing system and the source docketing system data that was formatted, verified and checked for errors, docketing data importing module 230 may flag the matter and the differences in fields for an operator to review and correct.

At operation 319, docketing data importing module 230 determines whether additional matters remain to be processed. For example, docketing data importing module 230 may determine whether all of the matters to be imported from the source docketing system have been formatted, verified and checked for errors. In response to determining that additional matters remain that have not been formatted, verified and checked for errors, docketing data importing module 230 proceeds to operation 320; otherwise docketing data importing module 230 proceeds to end the import process.

At operation 320, docketing data importing module 230 selects a next matter that has not been formatted, verified and checked for errors. Docketing data importing module 230 repeats performance of operations 312, 314, 316, 318 and 319 for the newly selected matter that has not been formatted, verified and checked for errors.

Figure 3B:
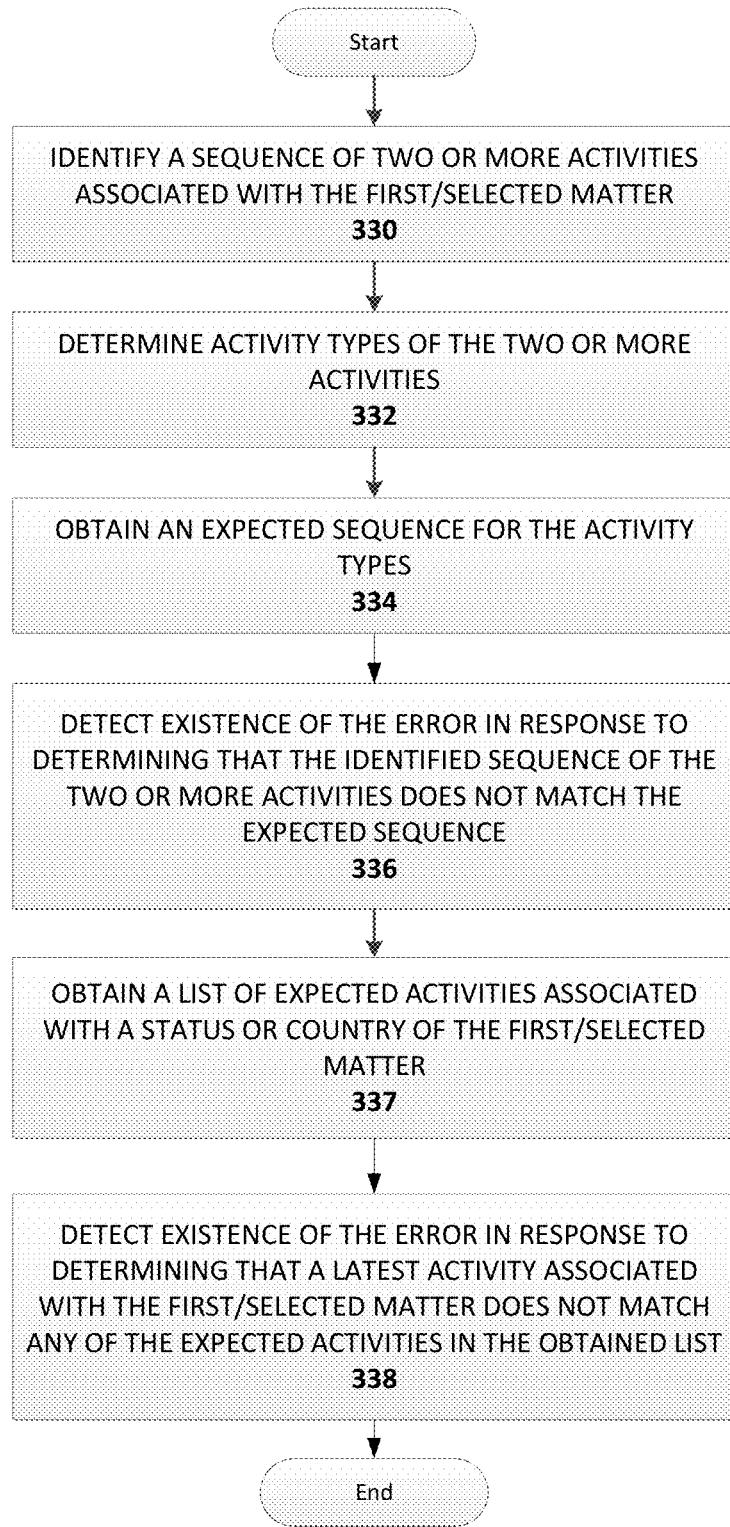

FIG. 3B is a block diagram showing a process for checking docketing information for errors based on two or more fields, according to example embodiments. The operations discussed below in connection with FIG. 3B may be performed in any order or may be omitted entirely. The operations of FIG. 3B may be a set of non-transitory or transitory computer readable instructions that docketing data importing module 230 may execute to import data from a source docketing system into a target docketing system.

At operation 330, docketing data importing module 230 identifies a sequence of two or more activities associated with the first/selected matter. For example, docketing data importing module 230 may determine that among a list of activities of a given matter, an office action sequentially (e.g., chronologically) follows a response to the same office action. Docketing data importing module 230 may access the documents associated with the response to the office action to determine the office action date to which the response was filed to determine whether the office action date matches the date of the office action that follows the response activity. If the dates match, docketing data importing module 230 determines that the response is to the same office action and is listed in the activities list before the corresponding office action.

At operation 332, docketing data importing module 230 determines activity types of the two or more activities. For example, docketing data importing module 230 may determine that the office action is an office action mailing activity type and the response to the office action is a response filing activity type.

At operation 334, docketing data importing module 230 obtains an expected sequence for the activity types. For example, docketing data importing module 230 access the sequence of activity types list 810 from storage. Docketing data importing module 230 identifies which activity type comes chronologically first in the list of activities in the matter (e.g., docketing data importing module 230 determines that response to office action comes first). Docketing data importing module 230 may identify the response to office action under the activity type 1 list and identify that activity type 2 (e.g., subsequent office action or allowance) is the expected activity type that sequentially follows the first activity. In this case, docketing data importing module 230 performs operation 336 to detect existence of an error in response to determining that the identified sequence of the two or more activities does not match the expected sequence. In particular, docketing data importing module 230 may determine that previous office action does not match the subsequent office action listed under activity type 2 field for the response filed activity type 1 field in list 810. In such circumstances, docketing data importing module 230 detects an error in the source docketing information.

As another example, docketing data importing module 230 may determine that among the list of activities for the matter, an allowance activity sequentially follows an issuance activity. Based on list 810, docketing data importing module 230 may determine that the expected activities that sequentially follow an issuance activity (e.g., maintenance fee due) do not match the allowance activity that sequentially follows the issuance activity in the matter. In such circumstances, docketing data importing module 230 detects an error in the docketing information.

The expected activities under activity type 2 in list 810 that are associated with each activity under activity type 1 list may represent activities that immediately sequentially follow (e.g., are adjacent chronologically to the corresponding activity) or follow the activity type 1 activity at some point in time. For example, a patent expiration activity type 2 activity associated with allowance activity type 1 activity may come after the issue fee payment activity and issuance activity and does not immediately follow the allowance activity. As another example, an issue fee payment type 2 activity associated with allowance activity type 1 activity may immediately follow the allowance activity. Docketing data importing module 230 may determine whether the two or more activities for the matter that are checked are immediately adjacent to each other or are separated by other activities. List 810 may indicate how many other activities can come between two given activities listed under the expected activity type 2 activities to determine whether the activities in the matter that are being checked are also separated by the same number of activities. For example, maintenance fee due activity corresponding to the allowance activity may be separated from the allowance activity by three other activities. Docketing data importing module 230 may obtain the maintenance activity for the matter being checked for errors and the allowance activity and determine whether the two activities are separated by three other activities. If so, docketing data importing module 230 may determine that no errors exist between these two activities. If less or more activities are between the selected activities (allowance and maintenance fee), docketing data importing module 230 may flag the matter for review by an operator or may select two or more activities between the allowance and maintenance fee activities to determine whether the sequence of the in between activities matches the expected sequence provided in list 810.

At operation 337, docketing data importing module 230 obtains a list of expected activities associated with a status or country of the first/selected matter. For example, docketing data importing module 230 may obtain list 820 (FIG. 8). Docketing data importing module 230 may retrieve the status or country associated with a given matter to be imported. Docketing data importing module 230 may search list 820 for the status/country that matches the retrieved status or country associated with the given matter to identify the expected latest activity for the status or country. Docketing data importing module 230 may retrieve the latest activity of the given matter and compare the retrieved activity to the expected latest activity obtained from list 820.

At operation 338, docketing data importing module 230 detects existence of the error in response to determining that the latest activity associated with the first/selected matter does not match any of the expected activities in the obtained list. For example, in response to determining that the latest activity of the given matter matches the expected latest activity obtained from list 820, docketing data importing module 230 determines that no error exists. In response to determining that the latest activity of the given matter does not match the expected latest activity obtained from list 820, docketing data importing module 230 determines that an error exists and may notify an operator.

As an example, a matter with an allowed status should have as the latest activity an issue fee payment or allowance. Docketing data importing module 230 may retrieve the status of the given matter and determine that the status is allowed. Docketing data importing module 230 may retrieve as the latest activity of the matter an office action. Since office action does not match the expected latest activity (issue fee payment or allowance), docketing data importing module 230 may determine that there is an error (e.g., either the status is wrong or the latest activity is incomplete). As a result, docketing data importing module 230 notifies an operator to correct the error.

As another example, a matter designated with a country of Australia can have as the latest activity an acceptance deadline. Docketing data importing module 230 may retrieve the country of the given matter and determine that the country is Australia. Docketing data importing module 230 may retrieve as the latest activity of the matter an office action and may also determine that no other activity includes an acceptance deadline. Since none of the activities includes the expected activity of acceptance deadline, docketing data importing module 230 may determine that there is an error. As a result, docketing data importing module 230 notifies an operator to correct the error.

As another example, a matter designated with a country of non-Australia or Europe includes a list of expected activities that does not include an acceptance deadline. Docketing data importing module 230 may retrieve the country of the given matter and determine that the country is Europe. Docketing data importing module 230 may retrieve as the latest activity of the matter acceptance deadline. Since none of the activities associated with the country of Europe includes the expected activity of acceptance deadline, docketing data importing module 230 may determine that there is an error. As a result, docketing data importing module 230 notifies an operator to correct the error.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations (e.g., from processes 301 and 302) may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 9:
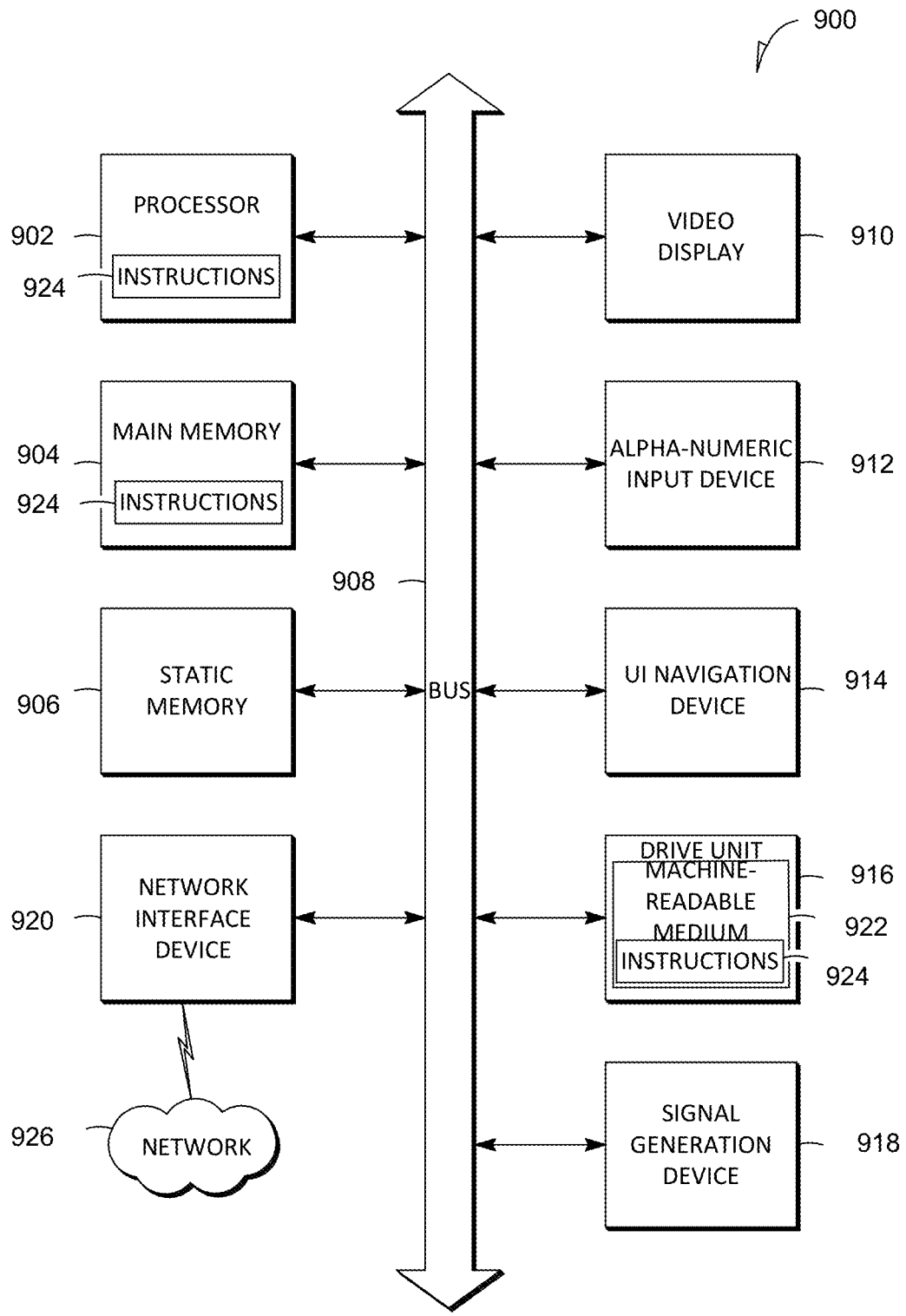
FIG. 9 is a block diagram of machine in the example form of a computer system within which a set of instructions, for causing the machine to perform any one or more of the methodologies herein discussed, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top block (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a non-transitory machine-readable medium 922 on which is stored one or more sets of non-transitory instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Note on the Abstract

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for importing docketing data, the method comprising:
    retrieving, from a storage device, a data structure that includes docketing information for a plurality of matters comprising a first matter from a source docketing system;
    searching a publicly available database to retrieve information associated with the first matter;
    verifying that data in at least one field of the first matter matches data in a corresponding field of the retrieved information;
    obtaining an expected activity type sequence that indicates a second activity type is expected to be present following occurrence of a first activity type;
    automatically detecting existence of an error in the first matter based on a combination of two or more fields of the first matter, the automatically detecting existence of the error comprising determining that a sequence of a plurality of activity types of the first matter does not match the expected activity type sequence; and
    storing the first matter in a target docketing system.

2. The method of claim 1, wherein searching the publicly available database comprises:
    obtaining country information from a country specific field associated with the first matter;
    accessing a list of addresses of a plurality of publicly available databases that includes the publicly available database, each associated with a different country; and
    retrieving, from the list, an address of the publicly available database associated with the obtained country information.

3. The method of claim 1, wherein the publicly available database includes patent information for patent matters from a plurality of countries.

4. The method of claim 1 further comprising:
    converting the docketing information from a first format of the source docketing system to a second format of the target docketing system; and
    repeating the searching, converting, verifying, automatically detecting, and storing steps for each of the plurality of matters.

5. The method of claim 1, wherein the automatic detection is performed before or after the first matter is stored in the target docketing system.

6. The method of claim 1, wherein the two or more fields of the first matter correspond to two or more activities associated with the first matter, and wherein automatically detecting existence of the error comprises:

identifying a sequence of the two or more activities;
determining activity types of the two or more activities;
obtaining an expected sequence for the activity types; and
detecting existence of the error in response to determining that the identified sequence of the two or more activities does not match the expected sequence.

7. The method of claim 1, wherein a first of the two or more fields of the first matter corresponds to a latest activity associated with the first matter, wherein a second of the two or more fields of the first matter corresponds to a status or country associated with the first matter, and wherein automatically detecting existence of the error comprises:
obtaining a list of expected activities associated with the status or country of the first matter; and
detecting existence of the error in response to determining that the latest activity of the first matter does not match any of the expected activities in the obtained list.

8. The method of claim 1, wherein verifying that data in at least one field of the first matter matches data in a corresponding field of the retrieved information comprises:
comparing the data in the at least one field of the first matter to the data in the corresponding field of the retrieved information;
in response to determining that the data in the at least one field of the first matter does not match the data in the corresponding field of the retrieved information, replacing the data in the at least one field of the first matter with the data in the corresponding field of the retrieved information; and
repeating the verifying for a remaining set of fields of the first matter.

9. The method of claim 1 further comprising:
determining that the first matter has been manually entered into the target docketing system; and
in response to determining that the first matter has been manually entered into the target docketing system:
retrieving from the source database information corresponding to the first matter; and
comparing the manually entered information for the first matter with information corresponding to the first matter retrieved from the source database.

10. The method of claim 9 further comprising flagging the manually entered information for user review in response to determining that the manually entered information for the first matter does not match the information corresponding to the first matter retrieved from the source database.

11. A patent management system comprising:
at least one patent database; accessible via a network; and storing data including docketing information for at least one matter stored in the database; and
a server, operatively connected to the network, wherein the server includes:
a processor; and
a memory; and
the processor configured to:
retrieve, from the at least one patent database, a data structure that includes docketing information for a plurality of matters comprising a first matter from a source docketing system;
search a publicly available database to retrieve information associated with the first matter;
verify that data in at least one field of the first matter matches data in a corresponding field of the retrieved information;
obtain an expected activity type sequence that indicates a second activity type is expected to be present following occurrence of a first activity type;
automatically detect existence of an error in the first matter based on a combination of two or more fields of the first matter, the automatically detecting existence of the error comprising determining that a sequence of a plurality of activity types of the first matter does not match the expected activity type sequence; and
store the first matter in a target docketing system.

12. The patent management system of claim 11, wherein the processor is configured to search the publicly available database by:
obtaining country information from a country specific field associated with the first matter;
accessing a list of addresses of a plurality of publicly available databases that includes the publicly available database, each associated with a different country; and
retrieving, from the list, an address of the publicly available database associated with the obtained country information.

13. The patent management system of claim 11, wherein the publicly available database includes patent information for patent matters from a plurality of countries.

14. The patent management system of claim 11, wherein the processor is further configured to:
convert the docketing information from a first format of the source docketing system to a second format of the target docketing system; and
repeat the searching, verifying, automatically detecting, and storing steps for each of the plurality of matters.

15. The patent management system of claim 11, wherein the two or more fields of the first matter correspond to two or more activities associated with the first matter, and wherein the processor is configured to automatically detect existence of the error by:
identifying a sequence of the two or more activities;
determining activity types of the two or more activities;
obtaining an expected sequence for the activity types; and
detecting existence of the error in response to determining that the identified sequence of the two or more activities does not match the expected sequence.

16. The patent management system of claim 11, wherein a first of the two or more fields of the first matter corresponds to a latest activity associated with the first matter, wherein a second of the two or more fields of the first matter corresponds to a status or country associated with the first matter, and wherein the processor is configured to automatically detect existence of the error by:
obtaining a list of expected activities associated with the status or country of the first matter; and
detecting existence of the error in response to determining that the latest activity of the first matter does not match any of the expected activities in the obtained list.

17. The patent management system of claim 11, wherein the processor is configured to verify that data in at least one field of the first matter matches data in a corresponding field of the retrieved information by:
comparing the data in the at least one field of the first matter to the data in the corresponding field of the retrieved information;
in response to determining that the data in the at least one field of the first matter does not match the data in the corresponding field of the retrieved information, replacing the data in the at least one field of the first matter with the data in the corresponding field of the retrieved information; and
repeating the verifying for a remaining set of fields of the first matter.

18. The patent management system of claim 11, wherein the processor is further configured to:
  determine that the first matter has been manually entered into the target docketing system; and
  in response to determining that the first matter has been manually entered into the target docketing system:
    retrieve from the source database information corresponding to the first matter; and
    compare the manually entered information for the first matter with information corresponding to the first matter retrieved from the source database.

19. The patent management system of claim 18, wherein the processor is further configured to flag the manually entered information for user review in response to determining that the manually entered information for the first matter does not match the information corresponding to the first matter retrieved from the source database.

20. A non-transitory computer readable medium comprising non-transitory computer-readable instructions that, when executed by one or more processors, configure the one or more processors to perform operations comprising:
  retrieving, from a storage device, a data structure that includes docketing information for a plurality of matters comprising a first matter from a source docketing system;
  searching a publicly available database to retrieve information associated with the first matter;
  verifying that data in at least one field of the first matter matches data in a corresponding field of the retrieved information;
  obtaining an expected activity type sequence that indicates a second activity type is expected to be present following occurrence of a first activity type;
  automatically detecting existence of an error in the first matter based on a combination of two or more fields of the first matter, the automatically detecting existence of the error comprising determining that a sequence of a plurality of activity types of the first matter does not match the expected activity type sequence; and
  storing the first matter in a target docketing system.

* * * * *

UNITED STATES PATENT AND TRADEMARK OFFICE
CERTIFICATE OF CORRECTION

PATENT NO. : 10,922,344 B2
APPLICATION NO. : 16/159387
DATED : February 16, 2021
INVENTOR(S) : Lundberg et al.

Page 1 of 1

It is certified that error appears in the above-identified patent and that said Letters Patent is hereby corrected as shown below:

In the Claims

In Column 21, Line 48, in Claim 11, delete "database;" and insert --database,-- therefor In Column 21, Line 48, in Claim 11, delete "network;" and insert --network,-- therefor Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*